United States Patent Office 3,647,722
Patented Mar. 7, 1972

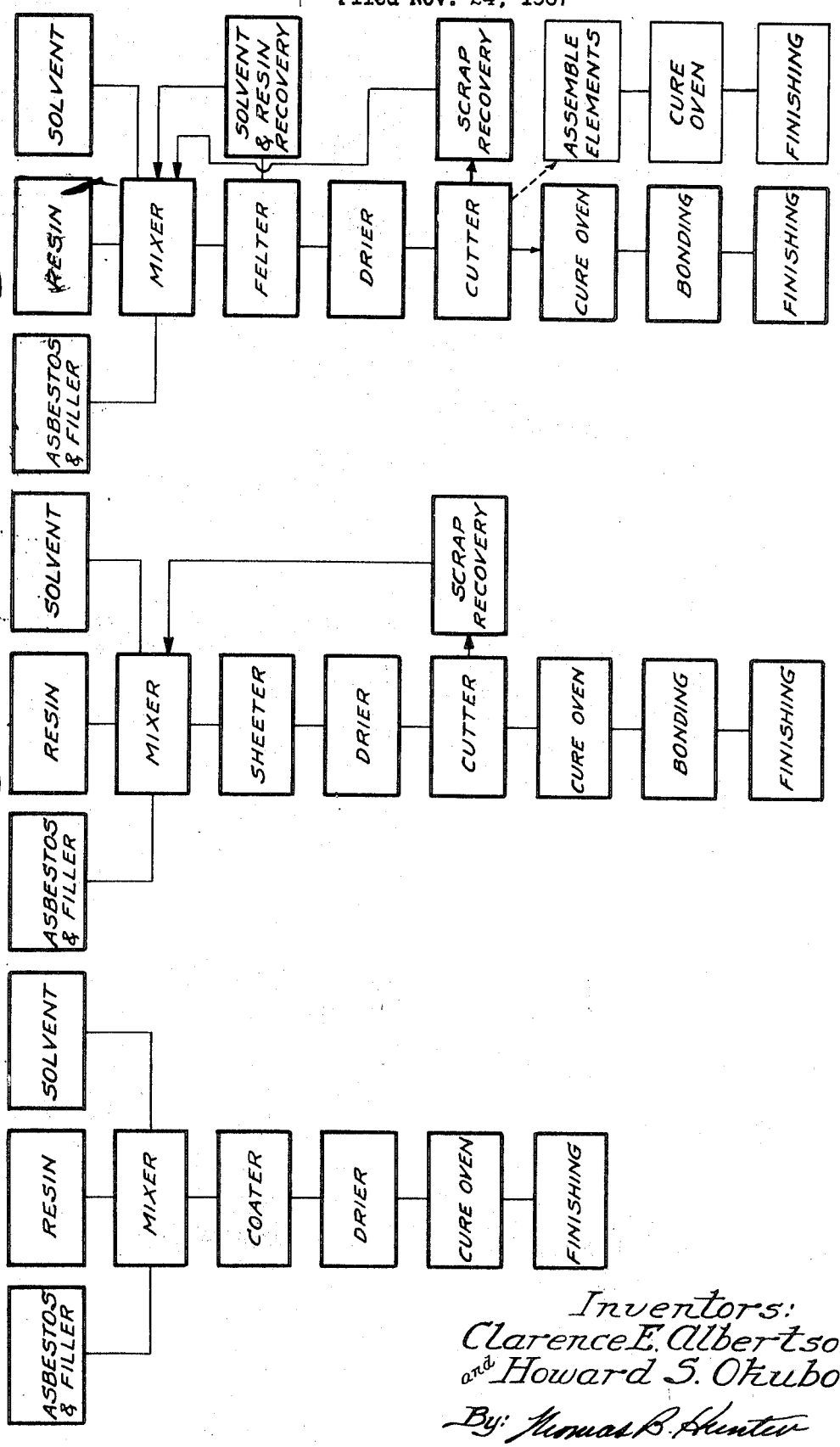

3,647,722
FRICTION ELEMENTS AND METHODS OF THEIR MANUFACTURE
Clarence E. Albertson, 240 S. Monterey, Villa Park, Ill. 60181, and Howard S. Okubo, 3318 N. Keystone, Chicago, Ill. 60641
Continuation-in-part of application Ser. No. 311,108, Sept. 24, 1963. This application Nov. 24, 1967, Ser. No. 689,237
Int. Cl. F16d *69/02;* C08g *37/08, 51/12*
U.S. Cl. 260—2.5 F          9 Claims

ABSTRACT OF THE DISCLOSURE

A method of manufacturing friction materials and/or elements by felting a slurry containing 70–100 percent asbestos fibers and 0–30 percent (based on dry ingredients) of a friction modifier such as barytes, cashew nut shell resin granules or other non-cellulosic fibers. A slurry is made by mixing the dry ingredients with phenolic, varnish-type resin dissolved in a suitable solvent. The amount of resin in the solution is adjusted to assure that the final material has a resin content of 15–35 percent. The solvent is evaporated from the felted material by drying and then the resin is set by heating at a higher temperature. Methods of forming coated friction elements are also described.

SUMMARY AND BACKGROUND OF THE INVENTION

This application is a continuation-in-part of parent application Ser. No. 311,108 filed Sept. 24, 1963, now abandoned.

This invention relates to improved methods of making friction materials and elements and more particularly to friction elements of the type comprising a backing or reinforcing member having a porous, non-cellulosic, wet clutch friction material secured thereto.

Torque control devices such as clutches and brakes which run continuously in a bath of oil or other fluid require friction materials having special properties to achieve optimum performance. Of primary importance is the requirement that such friction materials have interconnected porosity to promote the absorption of the oil deep into the interstices of the material. When the clutch is engaged and the friction facing is brought into contact with the driving (or driven member), the oil film carried on the facing must be removed by squeezing the oil into the material. Otherwise, the initial coefficient of friction is undesirably low.

One of the more commonly used wet clutch friction materials is a so-called "paper" lining or facing. This paper material is manufactured by saturating a cellulose fiber mat containing various fillers, such as diatomaceous earth and glass fibers, with a resin binder solution and then curing the resin binder. Cellulose fibers tend to break down at elevated temperatures (approximately 350° F.), so that friction materials prepared therefrom are not suitable for certain applications involving high temperature operation, such as in heavy duty transmissions and the like. Moreover, the process for manufacturing and applying the paper facing material to the backing or reinforcing members involves a substantial number of manufacturing operations and produces a considerable amount of scrap material which cannot be economically salvaged.

Examples of this "saturated paper" process are described in U.S. Pat. No. 2,733,798, issued at Almen et al., on February 7, 1956. Although Almen et al. suggest that the fibers may be selected from other materials besides cellulosic materials, the only specific examples describe the saturation of a felted ring of paper (substantially 100 percent cellulose fiber) or cork. The problem with making friction materials from non-cellulosic fibers, particularly asbestos, is that the porosity is extremely difficult to control. Insofar as applicants are aware, asbestos friction materials could not be made by the Almen et al. process, because the asbestos papers commercially available are too dense to saturate.

Other friction materials using asbestos fibers are those which are described generally as molded phenolic-asbestos materials. These materials, such as described for example in French Pat. 690,697, are made by mixing together asbestos fibers in a phenolic resin binder and then heating the mixture under pressure to form a very dense lining or brake material. Materials manufactured in this manner are unsuitable for wet clutch applications in that they do not have sufficient porosity to absorb oil.

One important aspect of the present invention is to provide an improved method of manufacturing a non-cellulosic friction material with the desired porosity for wet clutch applications. Briefly stated, a mixture of asbestos and friction modifying material, such as other non-cellulosic fibers, barytes and cashew nut shell resin, are mixed together with a binder containing a phenolic, varnish-type resin. The mixture, containing a non-aqueous solvent compatible with the resin, is felted onto a foraminous surface such as those employed in paper making machinery. A non-aqueous solvent must be used because water softens asbestos too much and reduces porosity. The excess solvent seeps through the felting surface and the rather dense cake is dried to evaporate excess solvent and then heated to a higher temperature to set the resin. The amount of resin contained in the binder solution is adjusted so that the finished material contains approximately 30 percent of the thermoset resin.

While this specification occasionally refers to friction materials adapted to be used in combination with a series of alternating discs or plates of the type employed in a multiple disc clutch, it is obvious that the principles of the present invention have utility in clutches or brakes of various designs, such as for example, cone clutches, expanding shoe clutches, and other types.

It is thereofore a general object of the present invention to provide an improved method of making non-cellulosic, porous, friction materials suitable for wet clutch applications, said materials being stable at relatively high temperatures and having all the required properties of a good quality, wet clutch friction material.

Other objects and advantages will be apparent from a reading of the following detailed description taken in conjunction with the drawings.

DESCRIPTION OF DRAWINGS

FIG. 1 is a schematic process diagram illustrating a preferred embodiment of the present invention;

FIG. 2 is a schematic process diagram illustrating a modification of the process; and FIG. 3 is a schematic process diagram illustrating still another modification of the process.

DETAILED DESCRIPTION

The friction material prepared in accordance with the present invention is a non-cellulosic, thermosetting resin bonded, asbestos-based material containing no more than 30 percent of friction modifying fillers, such as for example, barytes, cashew nut shell resin granules or other non-cellulosic fibers (carbon and graphite fibers, glass fibers, metal fibers and high temperature polymeric fibers).

The process used in the preparation of the material may be summarized as comprising four basic steps from which variations may be made according to the particular manner in which the material is secured to the reinforcing members. Initially, an admixture of the dry ingredients—asbestos fibers and the dry friction modifying materials—is provided. This admixture is combined with a binder solution containing a heat curable or thermosetting resin dissolved in a suitable low boiling point non-aqueous solvent to provide a homogeneous mixture. The solvent is then dried to transform the material into a porous mass, the solvent being evaporated from the interstitial portions of the material thereby leaving the material impregnated with the uncured resin. Thereafter, the material is heated to temperatures within the curing range for the particular resin used to effect chemical cross-linking thereof.

While various methods for preparing the friction material and applying said material to the clutch element are described herein, in each case the final composition of the improved friction material comprises asbestos fibers having interspersed, friction modifying filler materials, such as barytes (natural barium sulfate) polymerized cashew nut shell resin, or other non-cellulosic fibers (glass, carbon, metal, high-temperature polymers etc.), and a cured resin binder such as an oil modified (varnish type) phenolic resin.

For a better understanding of this invention, specific, illustrative, but non-limiting, examples of the composition and methods for manufacturing the improved friction composition, are set forth herein.

Example I

In a preferred manner of practicing the invention, the improved friction material composition is coated onto a metal backing plate or element which constitutes one of the driving and/or driven members of the clutch mechanism. For ease of application, the material, in a pasty or dough-like form, is spread onto the surface of an adhesive primed backing plate. The coated plate is thereafter dried to remove the solvent and render the material porous, placed in a curing environment, and finished by grinding or some equivalent method.

This process, hereinafter referred to as the coating process, has the advantages of (1) requiring a minimum number of process steps, (2) having the least waste or scrap as by-products of the process, and (3) being the most well-adapted for continuous process production techniques.

The following recipe (given in parts by weight) was employed in the preparation of one of the materials.

|  | Parts |
|---|---|
| Chrysotile asbestos (7D-1)[1] | 64 |
| Fillers: | |
| Barytes | 10 |
| Resin granules[2] | 10 |
| Binder solution[3] | 60 |
| Solvent (essentially ethyl alcohol) | 142 |

[1] Canadian scale.
[2] A cashew nut shell resin known as "Collan 10A" (approximately 20 mesh).
[3] A varnish-type phenolic resin (50% solids).

Referring now to FIG. 1, the dry components comprising asbestos, barytes and the cashew nut shell resin were mixed thoroughly for about ten minutes to provide a homogeneous admixture thereof. The resin solution, after being thinned with the solvent and mixed, was then added to the dry mixture and mixing was continued for approximately one hour until the consistency of the mixture was sufficiently stiff to provide a uniform distribution of the particulates. The larger cashew nut shell resin granules showed no tendency to settle out, even after long standing. It was found desirable to mix the ingredients in a closed container to minimize solvent evaporation during the mixing period.

The metal backing plates of the type used in a conventional multiple disc clutch were provided with a suitable adhesive and then coated with the stiff, dough-like mixture to provide a coating of approximately 0.050 inch on both sides of each plate. This coating procedure may be performed in a fixture or mold which is preferably coated with a silicone grease or other releasing agent to prevent the adherence of the coating thereto. Each plate was coated, one side at a time, by distributing about 14 g. of the coating mixture over the surface of the plate, tamping the slurry to eliminate any air pockets and then smoothing the surface with an appropriate implement to eliminate any unevenness left after the tamping.

The solvent was evaporated by heating the coated plate at a temperature of approximately 130° F. for three hours. While there was some evidence of coating shrinkage during the drying cycle, it did not occur in a direction parallel to the lining surface and was therefore of no consequence.

The coated plates are preferably removed from the coating fixture prior to being placed in a curing oven. In the example, the coated plates were supported in such a way that the supports engaged an uncoated portion thereof and were placed in an oven for approximately one-half hour at a curing temperature of approximately 360°–370° F.

The cured lining, after the solvent evaporation and curing steps, had a rather rough surface as a result of the evaporation of solvent from the mixture. Since it is necessary that surfaces of the clutch plate be flat and parallel for optimum performance, the cured plates were finished by grinding to the required total thickness (approximately 0.100").

Example II

Referring now to FIG. 2, there is illustrated a modification of the process as described above in connection with Example I. The recipe and the initial steps of premixing the dry ingredients, adding the resin solution and mixing the dry ingredients with the resin solution may be identical to those described in Example I above. However, rather than coating the plates individually, an alternative method of fabricating the friction elements comprises the steps of rolling out or calendaring the dough-like mixture into thin sheets of relatively uniform thickness, drying the sheets, cutting the sheets into the appropriate size and shape, and then bonding the sheet material to the backing plates. The plates are then placed in a curing oven and finished in the manner described above. It will be noted that this process requires a scrap recovery step after the material is cut into the appropriate form for bonding to the backing plates.

Example III

Attention is now directed to FIG. 3 which illustrates a modified process for preparing the improved friction materials. For convenience, this process is referred to herein as the felted lining process.

The following recipe (given in parts by weight) was employed.

|  | Parts |
|---|---|
| Chysotile asbestos (7D-1)[1] | 19 |
| Barytes | 3 |
| Resin (Collan 10A), 20 mesh granules | 3 |
| Resin solution, 50% solids | 144 |
| Solvent (essentially ethyl alcohol) | 72 |
| Xylene | 144 |

[1] ½ passed 8 mesh screen.

The dry ingredients, namely the asbestos, barytes, and Collan 10A resin granules were dry mixed at slow speeds in a laboratory mixer. The resin solution was thinned with solvent and xylene, added to the dry ingredients, and mixed to form a slurry having the consistency of thick cream. It was noted that the speed of the mixer and the length of the mixing time was rather important since too vigorous mixing broke up the asbestos fiber bundles and increased the number of fine particles in the slurry. The longer fibers tended to ball up and rope in the mildly stirred slurries. The use of more solvent assists in providing a more uniform slurry, but this advantage must be balanced against increased material segregation in the thinner slurries.

After mixing, the slurry was poured into a felting medium which, in the example, was a vacuum filter. The slurry was evenly distributed by oscillating and shaking the filter back and forth and a vacuum of approximately 2″ of Hg was applied to draw the solvent and resin solution through the filter and "felt" the friction composition onto the filter face. The resulting felted composition was then dried at room temperature to minimize resin migration. After removal from the felting medium, the dried material was noted to be flexible and plastically deformable like a stiff dough. The lining discs were then cut from the air dried composition and lightly coated with the resin solution on the side to be bonded. The scrap material from the cutting process may be resaturated in alcohol and used again because the saturating resin, at this stage, is still uncured.

Example IV

The following table illustrates other recipes for preparing the felted friction material in accordance with the process outline in Example III.

TABLE
[Parts by weight]

| Sample | A | B | C | D | E | F | G |
|---|---|---|---|---|---|---|---|
| Chrysotile asbestos: | | | | | | | |
| 7D-1[1] | | | 18 | | | 18 | 19 |
| 7D-5[1] | 20 | | | 17 | 19 | | 16 |
| Varnish type phenolic resin solution (50% solids) | 140 | 140 | 140 | 140 | 140 | 140 | 140 |
| Alcohol (ethyl) | 70 | 70 | 70 | 70 | 70 | 70 | 70 |
| Xylene | 140 | 140 | 140 | 140 | 140 | 140 | 140 |
| Heat-resistant nylon [2], ⅛″-¼″ cut fibers | | 2 | | | | | |
| Barytes | | | | | | 5 | |
| Aluminum fibers, ⅛″-¼″ long | | | | | | | 3 |
| Cashew nut shell resin [3] | | | | | | 5 | 4 |
| Carbon fibers, ⅛″-¼″ cut fibers | | | | 3 | | | |
| Fine E glass fibers, ⅛″-¼″ long | | | | | 4 | | |

[1] Canadian scale.
[2] Nomex (Du Pont).
[3] Collan 10A, 20 mesh granules.

The solvent composition was adjusted to cause the binding resin to uniformly coat the composition, without excessive resin migration to the surface of the lining composition during the drying step. Alcohol soluble phenolic varnishes tolerate some aromatic solvent, but precipitate as the portion of aromatic solvent increases. An aromatic solvent, xylene, which evaporates slower than ethyl alcohol, was added to the compositions. The increased rate of alcohol evaporation changes the relative proportion of alcohol and xylene enough to precipitate the alcohol soluble phenolic resin in the lining. The bulk of the solvents can then evaporate without causing migration of the binding resin. The amount of thermosetting resin in the composition is adjusted to give a final resin content of 15 percent to 35 percent, to the finished lining. Higher resin contents are used when increasing amounts of filler are added to the compositions.

Each of the above-identified processes as recited in the examples have individual advantages and drawbacks which may render one process more applicable than another in any given situation. The felted lining process, which distributes the fibers more randomly than the coated lining processes, gives a somewhat stronger lining and is better adapted for close control of the porosity. On the other hand, the extra bonding and scrap recovery steps would appear to make it somewhat less economical than the coated processes. In any event, it can be seen that the present invention provides an improved friction material which is especially adapted for mass production techniques and a material which is more stable at higher temperatures than the cellulosic or "paper" wet clutch linings so commonly used in the prior art.

As mentioned in the preliminary remarks, an important aspect of the invention is concerned with preparing a material having interconnected (as distinguished from isolated) pores or voids distributed uniformly throughout the material. More specifically, the overall porosity should be at least 35 percent by volume, preferably between about 40 percent and about 65 percent. Friction materials made in accordance with the methods described herein were able to completely absorb a drop of oil placed on its surface within 3 to 15 seconds, thus indicating that the oil film could be readily squeezed into the body of the friction facing when the clutch element is engaged. The high side of the optimum porosity range is determined by the material strength. Linings having a void content much in excess of 65 percent by volume are weak and have a tendency to tear in heavy duty service.

The particulate filler material used in the preparation of the friction material should not be present in amounts greater than 30 percent (based on the dry weight of the asbestos fibers and the filler material). Such filler materials are preferably under 200 mesh filler powders. More particulate filler than these will plug up the porosity of the sheet. From 70 percent to 100 percent of non-cellulosic fibers are used. The 7D grade of asbestos fibers is preferred. Shorter fibers form lining structures which become denser and give poorer frictional performance. Fibers shorter than grade 7H are unacceptable. Longer fibers can be used satisfactorily, but cost more. Other non-cellulosic fibers can be used in place of some of the asbestos, such as carbon and graphite fibers, fine glass fibers, metal fibers, or a high temperature polymeric material such as Nomex (a Du Pont high temperature nylon). These other fibers can be added to increase porosity and strength. Because they are more expensive, the amounts used are held to the minimum required to achieve the desired lining strength and structure.

In each case, the solvent and asbestos proportions are adjusted to give the desired porosity and strength. The particular grade of asbestos is also important because the longest asbestos fibers make linings which are too low in density and wear too fast. On the other hand, the use of fibers which are too short make linings which are too dense and do not yield the desired porosity characteristics.

While the invention has been described in connection with certain specific examples, it is to be understood that this is by way of illustration and not by way of limitation; and the scope of this invention is defined solely by the appended claims which should be construed as broadly as the prior art will permit.

What is claimed is:

1. A method of preparing a porous friction material having interconnected voids occupying 35–65 percent of the volume thereof, comprising the steps of: forming an admixture of 70–99.5 percent by weight asbestos and 0.5–30 percent by weight of a friction modifier selected from the group consisting of barytes, cashew nut shell granules, and non-cellulosic fibers other than asbestos, combining said admixture with a sufficient quantity of a binder solution to provide a paste, said binder solution including an uncured thermosetting resin dissolved in a low boiling point non-aqueous solvent, said resin being present in a quantity sufficient to provide a resin content of 15–35 percent by weight in the finished product; evaporating the solvent at a temperature below the curing temperature of said resin to transform the material into a porous mass; and curing the resin retained in the material under atmospheric pressure.

2. A method as defined in claim 1 wherein said resin is an oil-modified phenolic resin.

3. A method of preparing a porous friction material having interconnected voids occupying 35-65 percent of the volume thereof, comprising the steps of: forming an admixture comprising 70-99.5 percent by weight of asbestos fibers, and 0.5-30 percent by weight of a friction modifier selected from the group consisting of barytes, cashew nut shell resin granules and non-cellulosic fibers other than asbestos; forming a slurry by combining said admixture with a non-aqueous solvent containing an uncured thermosetting resin in a quantity sufficient to provide a resin content between 15-35 percent by weight based on the finished material; felting said slurry on a foraminous surface; evaporating said solvent to form a porous mass; and curing the resin retained in said mass under atmospheric pressure.

4. A method as defined in claim 3 wherein said resin is an oil-modified phenolic resin.

5. A method of preparing a porous friction material having interconnected voids occupying 35-65% of the volume thereof comprising the steps of: forming a slurry containing (A) asbestos fibers, (B) a friction modifier selected from the group consisting of barytes, cashew nut shell resin granules and non-cellulosic fibers other than asbestos, and (C) a binder solution including an uncured thermosetting resin dissolved in a low boiling point, non-aqueous solvent, said resin being of sufficient quantity to provide a resin content of between 15-35% by weight based on the finished material; felting said slurry on a foraminous surface; evaporating said solvent without applying pressure to the material; and curing said resin at a higher temperature under atmospheric pressure.

6. A method as defined in claim 5 wherein said resin is an oil modified phenolic resin.

7. A method as defined in claim 1 wherein said non-celluslosic fibers are selected from the group consisting of carbon, aluminum, glass and high temperature polymeric fibers.

8. A method as defined in claim 3 wherein said non-cellulosic fibers are selected from the group consisting of carbon, aluminum, glass and high temperature polymeric fibers.

9. A method as defined in claim 5 wherein said non-cellulosic fibers are selected from the group consisting of carbon, aluminum, glass and high temperature polymeric fibers.

References Cited

UNITED STATES PATENTS

| | | | |
|---|---|---|---|
| 2,354,389 | 7/1944 | Lidkea | 161—205 |
| 2,849,346 | 8/1958 | Almen et al. | 117—98 |
| 3,092,595 | 6/1963 | Smith et al. | 260—3 |

JOHN C. BLEUTGE, Primary Examiner

W. J. BRIGGS, SR., Assistant Examiner

U.S. Cl. X.R.

117—98; 161—170; 162—155, 165; 192—107 M; 260—17.2 R, 2.5 R, 38, 838, Dig. 39